US010657086B2

(12) United States Patent
Meriac et al.

(10) Patent No.: US 10,657,086 B2
(45) Date of Patent: May 19, 2020

(54) METHODS FOR RECONCILING INTERRUPT CONFLICTS

(71) Applicant: Arm IP Limited, Cambridge (GB)

(72) Inventors: Milosch Meriac, Cambridge (GB); Alessandro Angelino, London (GB)

(73) Assignee: ARM IP LIMITED, Cambridge (GB)

( * ) Notice: Subject to any disclaimer, the term of this patent is extended or adjusted under 35 U.S.C. 154(b) by 0 days.

(21) Appl. No.: 16/303,305

(22) PCT Filed: May 26, 2017

(86) PCT No.: PCT/GB2017/051499
§ 371 (c)(1),
(2) Date: Nov. 20, 2018

(87) PCT Pub. No.: WO2017/203274
PCT Pub. Date: Nov. 30, 2017

(65) Prior Publication Data
US 2019/0213038 A1      Jul. 11, 2019

(30) Foreign Application Priority Data

May 27, 2016   (GB) .................................. 1609418.7

(51) Int. Cl.
*G06F 13/26* (2006.01)
*G06F 9/48* (2006.01)
*G06F 21/62* (2013.01)

(52) U.S. Cl.
CPC ............ *G06F 13/26* (2013.01); *G06F 9/4812* (2013.01); *G06F 9/4818* (2013.01);
(Continued)

(58) Field of Classification Search
CPC .......... G06F 13/10; G06F 13/24; G06F 13/26; G06F 13/34; G06F 2009/45562;
(Continued)

(56) References Cited

U.S. PATENT DOCUMENTS

| 4,914,580 | A | * | 4/1990 | Jensen | .................... | G06F 13/26 |
|---|---|---|---|---|---|---|
| | | | | | | 710/265 |
| 5,083,261 | A | * | 1/1992 | Wilkie | .................... | G06F 13/26 |
| | | | | | | 710/265 |

(Continued)

FOREIGN PATENT DOCUMENTS

| EP | 0 528 139 | 2/1993 |
|---|---|---|
| EP | 1 422 627 | 5/2004 |

(Continued)

OTHER PUBLICATIONS

Rubini, Alessandro, et al. "Linux Device Drivers". 2nd Edition. Jun. 2001. O'Reilly & Associates. pp. 217-219. (Year: 2001).*

(Continued)

*Primary Examiner* — Thomas J. Cleary
(74) *Attorney, Agent, or Firm* — Nixon & Vanderhye PC

(57) ABSTRACT

A machine implemented method for prioritizing system interrupts in a processing system is provided. The method comprising: determining, at a supervisor module, for each interrupt, a relative interrupt priority in accordance with at least one interrupt parameter for said interrupt; prioritising, at said supervisor module, each said interrupt with respect to other interrupts of said system in compliance with said determined relative interrupt priority; and in response to a change to said at least one interrupt parameter during operation of said system, adjusting said determined relative interrupt priority, and re-prioritising each said interrupt with respect to said other interrupts of said system in compliance with said adjusted relative interrupt priority.

22 Claims, 10 Drawing Sheets

(52) U.S. Cl.
CPC .......... *G06F 9/4837* (2013.01); *G06F 9/4887* (2013.01); *G06F 21/6209* (2013.01)

(58) Field of Classification Search
CPC ............. G06F 2009/45575; G06F 9/48; G06F 9/4812; G06F 9/4818; G06F 9/4831; G06F 9/4837; G06F 9/4881; G06F 9/4887; G06F 3/1263; G06F 2213/24; G06F 21/6209
See application file for complete search history.

(56) References Cited

U.S. PATENT DOCUMENTS

| | | | | |
|---|---|---|---|---|
| 5,257,357 | A * | 10/1993 | Yishay | G06F 13/26 710/269 |
| 5,528,767 | A * | 6/1996 | Chen | G06F 13/364 370/462 |
| 5,530,875 | A * | 6/1996 | Wach | G06F 13/26 710/264 |
| 6,845,419 | B1 * | 1/2005 | Moyer | G06F 13/26 710/261 |
| 2004/0095935 | A1 * | 5/2004 | Connor | H04L 47/10 370/392 |
| 2004/0153596 | A1 | 8/2004 | Monteiro | |
| 2005/0076324 | A1 | 4/2005 | Lowell et al. | |
| 2005/0125580 | A1 | 6/2005 | Madukkarumukumana et al. | |
| 2005/0177667 | A1 * | 8/2005 | Kimelman | G06F 9/4818 710/260 |
| 2007/0143515 | A1 * | 6/2007 | Kershaw | G06F 13/26 710/264 |
| 2008/0126618 | A1 | 5/2008 | Pardo | |
| 2009/0248935 | A1 | 10/2009 | Ehrlich et al. | |
| 2012/0303850 | A1 * | 11/2012 | Sarkar | G06F 13/26 710/265 |

FOREIGN PATENT DOCUMENTS

| | | |
|---|---|---|
| EP | 1 939 742 | 7/2008 |
| EP | 2 495 656 | 9/2012 |
| GB | 2 360 612 | 9/2001 |
| GB | 2 433 794 | 7/2007 |
| WO | 2004/023288 | 3/2004 |
| WO | 2015/069600 | 5/2015 |

OTHER PUBLICATIONS

International Search Report and Written Opinion of the ISA for PCT/GB2017/051499, dated Aug. 24, 2017, 12 pages.
Combined Search and Examination Report for GB1609418.7, dated Oct. 21, 2016, 10 pages.
Search and Examination Report for GB1609418.7, dated Feb. 28, 2017, 7 pages.

* cited by examiner

METHODS FOR RECONCILING INTERRUPT CONFLICTS

This application is the U.S. national phase of International Application No. PCT/GB2017/051499 filed 26 May 2017, which designated the U.S. and claims priority to GB Patent Application No. 16 09418.7 filed 27 May 2016, the entire contents of each of which are hereby incorporated by reference.

The present techniques relate to methods for reconciling interrupt conflicts. More particularly, the techniques relate to methods for prioritising interrupts to resolve interrupt conflicts.

Interrupt requests are signals sent to a processor that temporarily stop a running program and allow an interrupt to run instead. In large systems containing multiple hardware and software modules, numerous interrupts can be sent to the processor. When two, or more, of the modules use the same interrupt identifier to indicate an interrupt, for example, the watchdog IRQ, or a generic UART IRQ, then an interrupt conflict can occur. In addition, when two, or more, interrupts are required to be run at the same time or at overlapping times, an interrupt conflict can occur.

According to a first technique, there is provided a machine implemented method for prioritising system interrupts in a processing system. The method comprising: determining, at a supervisor module, for each interrupt, a relative interrupt priority in accordance with at least one interrupt parameter for said interrupt; prioritising, at said supervisor module, each said interrupt with respect to other interrupts of said system in compliance with said determined relative interrupt priority; and in response to a change to said at least one interrupt parameter during operation of the system, adjusting said determined relative interrupt priority, and re-prioritising each said interrupt with respect to other interrupts of said system in compliance with said adjusted relative interrupt priority.

According to a second technique, there is provided a machine implemented method for creating one or more instances of a module in a processing element. The method comprising: allocating private memory to each of said one or more instances of said module; copying said modules interrupts and associated interrupt parameters; applying said copied interrupts and associated interrupt parameters to each of said one or more instances of said module; determining, at a supervisor module, for each copied interrupt, a relative interrupt priority in accordance with at least one of said associated interrupt parameter; and prioritising, at said supervisor module, each said copied interrupt with respect to other interrupts of said system in compliance with said determined relative interrupt priority; wherein each said one or more instances of said module is isolated from said module and other instances of said module.

According to a third technique, there is provided a data processor for prioritising system interrupts in a processing system. The data processor comprising: processing circuitry configured to determine for each said interrupt a relative interrupt priority in accordance with at least one interrupt parameter for said interrupt, and to prioritise each said interrupt with respect to other interrupts of said system in compliance with said determined relative interrupt priority; said processing circuitry further configured to, in response to a change to said at least one interrupt parameter during operation of the system, adjust said determined relative interrupt priority, and re-prioritising each said interrupt with respect to other interrupts of said system in compliance with said adjusted relative interrupt priority.

According to a fourth technique, there is provided a computer program product comprising programme code for performing the methods described herein.

According to a fifth technique, there is provided a computer readable medium having computer readable program code embodied thereon for performing the methods described herein.

Embodiments will now be described with reference to the accompanying figures of which:

Interrupts can be executed in a context that has more privileges than the normal non-privileged context and some interrupts require access to peripherals that might be security critical. Consequently, interaction among running interrupt routines can be exploited in many ways, such as by denial-of-service, over-privileging, etc. For example, a hacker could disrupt a system by preventing a module that is responsible for detecting Malware from executing or by preventing a safety mechanism from activating—such as a safety mechanism for stopping a system when the system is going too fast etc. In another example, malware or defective software could violate Federal Communications Commission (FCC) regulations by violating timing requirements of wireless drivers running on the same CPU-Core or on a second core on the same system on chip (SoC).

Interrupt parameters can be associated with each modules interrupts by the provider of the module. The interrupt parameters define characteristics regarding the interrupts which indicate the importance of the interrupt and constrain the operation of the interrupt. The interrupt parameters can be used to determine a relative priority of each interrupt relative to the other interrupts of the system. Consequently, when a system is built using multiple modules or when a module is added to an existing system, the interrupts of each module can be reconciled with the interrupts of the other modules of the system in order to prioritises the interrupts. By reconciling and adapting the interrupt priorities, whilst the system is running, the number of interrupt conflicts can be reduced.

In addition, by defining characteristics of the interrupts, which constrain the operation of the interrupt, it can be ensured that modules of the system do not violate their permissions when using interrupts, and that the security of the system is maintained.

Figure 1:
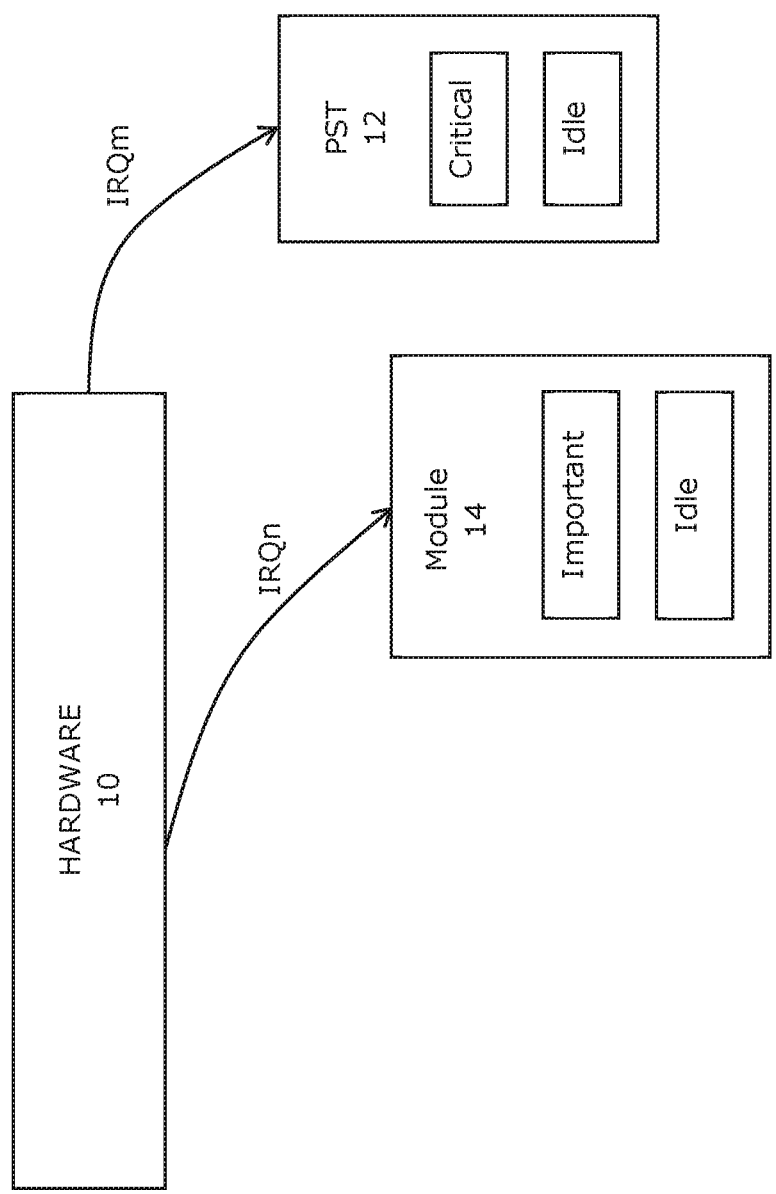
FIG. 1 illustrates schematically a basic computer system.

FIG. 1 illustrates a processing element, such as a basic system comprising a hard ware (HW) 10, a periodic system timer (PST) module 12 and another module 14. The periodic system timer module 12 and the module 14 both have at least one interrupt parameter associated with its interrupts. In this embodiment, both modules have an "assigned priority" parameter defining the module providers deemed priority level for that modules interrupts. It is possible for the interrupts of each module to have different "assigned" priorities. For example, each module may issue more than one interrupt and each interrupt may have a different "assigned priority" parameter. Normally, the multiple interrupts of each module are balanced such that each module does not suffer from interrupt conflicts between its own interrupts.

Referring to FIG. 1, the assigned priority parameter associated with the interrupts issued from the periodic system timer module 12 is "critical". In addition, the assigned priority parameter associated with the interrupts issued from the module 14 is "important". A "critical" interrupt is deemed to be higher in the hierarchy of assigned priorities than an "important" interrupt. Table 1 below illustrates an example of a hierarchy of assigned priorities. The top of table 1 having the highest priority.

TABLE 1

Assigned Priority Hierarchy

Real time Critical
Critical
Real time Important
Important
Idle

Therefore, in the system of FIG. 1, an interrupt received from the periodic system timer module 12, which has a "critical" assigned priority, is prioritised over an interrupt received from the module 14, which has an "important" assigned priority by the interrupt controller. For example, when an interrupt is running from the module 14, and an interrupt request is received from the periodic system timer module 12, then the interrupt from module 14 is paused whilst the interrupt from the periodic system timer module 12 is run. Equally, when an interrupt from the periodic system timer module 12 is running and an interrupt request is received from the module 14, then the interrupt from module 14 is paused until the interrupt from the periodic system timer module 12 has completed.

The interrupts of each module are associated with at least one interrupt parameter, the parameter being defined by the provider of the module. In FIG. 1, each module is associated with an "assigned priority" parameter. However, since each module of the overall system can be provided by a different provider and each module is not aware of the other modules of the system until assembly of the system, one or more modules of the system may have been associated with the same "assigned priority". For example, referring to FIG. 1, both the periodic system timer module 12 and the module 14 could issue interrupts having an assigned priority level of "critical". When interrupts from two different modules have the same assigned priority parameter, then an interrupt conflict could occur, which should to be avoided.

It is possible to associate one or more interrupt parameters with each interrupt. The interrupt parameters are associated with each interrupt by the module provider prior to installation of the module. In another embodiment, the interrupt parameters are associated with each interrupt by the module provider when an update is run. The interrupt parameters define information regarding the interrupts which constrains the operation of the interrupt in the system and indicates the importance of the interrupts. The interrupt parameters can be used to determine a "relative priority" for each interrupt. The "relative priority" of each interrupt is a determined priority of the interrupt, determined relative to the other interrupts of the system, and in accordance with the interrupt parameters, such that the interrupt parameters of each interrupt are complied with.

For example, when interrupts from two different modules have the same assigned priority parameter, a "relative priority" is determined for each interrupt, in accordance with the interrupt parameters associated with each interrupt. Essentially, the importance of one of the interrupts is increased by raising the "relative priority" of that interrupt in relation to the "relative priority" of the other interrupt such that an interrupt conflict does not occur. A supervisor module of the system, such as ARM's™ uVisor, determines the "relative priority" of the interrupts of the system, prior to interrupt being handled by the interrupt controller. The supervisor module of the system may determine the "relative priority" of the interrupts during compile time, or during installation of a new module to the system.

The supervisor module may be an internal or an external hardware state machine with the ability to reconcile priorities over one or more CPU cores/processors.

Any type of data list structure can be used to store the at least one interrupt parameter associated with each interrupt. According to one embodiment, the interrupt parameters can be stored as an access control list (ACL). According to another embodiment, the access control list can be stored in an in-memory data table.

An interrupt parameter can define an assigned priority requirement for the interrupt, as discussed above. However, the interrupt parameters can also define timing requirements for the interrupts, and/or safety and/or security requirements for the interrupts.

The timing requirements for the interrupts can comprise at least one of: duration; frequency; non-interrupt-ability; atomicity; required latency guarantee; maximum latency. The safety and/or security requirements for the interrupts can comprise at least one of: privacy; core registers; hw context privacy; sharing; permissions.

Each interrupt can be associated with one or more parameter of: an assigned priority requirement, a timing requirement, a safety and/or security requirement. Each parameter defines a constraint which is to be applied to the operation of the interrupt in the system and can be used to determine a relative priority of the interrupt, relative to the other interrupts of the system.

Figure 2:
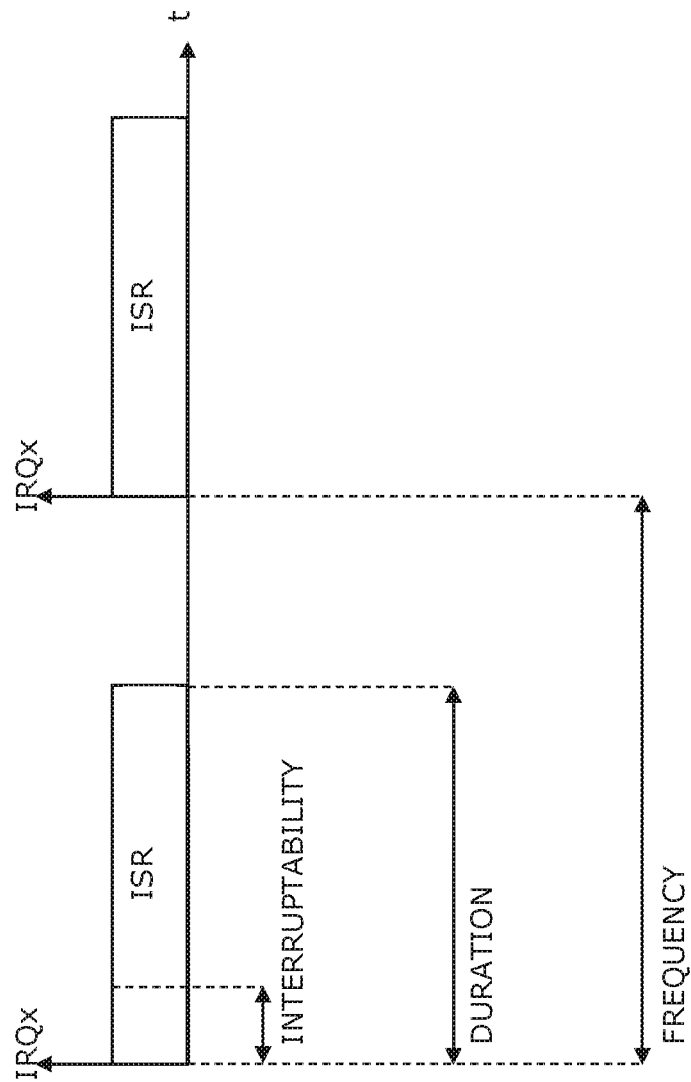
FIG. 2 illustrates schematically duration, frequency and non-interrupt-ability parameters.

FIG. 2 illustrates schematically, duration, frequency and non-interrupt-ability parameters which can be associated with an interrupt.

The duration parameter defines a period of time required for the interrupt service routine (ISR) to execute in response to the interrupt request. In one embodiment, the duration is the maximum period of time allowed for the interrupt service routine (ISR) to execute in response to the interrupt without interruptions by the system.

The duration parameter can be used to adjust the relative priority of the interrupt. For example, when another interrupt occurs which would disrupt the duration requirement of a first interrupt, the first interrupt is granted a higher relative priority such that the duration requirement is not disrupted.

The frequency parameter defines the rate of occurrence of the interrupt. In one embodiment, the frequency defines the minimum rate of occurrence of the interrupt that should be allowed by the system.

The frequency parameter can be used to adjust the relative priority of the interrupt. For example, when another interrupt occurs which would disrupt the frequency requirement of a first interrupt, the first interrupt is granted a higher relative priority such that the frequency requirement is not disrupted.

However, equally when another interrupt occurs which would not disrupt the frequency requirement of the first interrupt, the first interrupt is granted a lower relative priority, as long as the frequency requirement is still met.

The non-interrupt-ability parameter defines a minimum period of time of non-interrupt-ability i.e. a minimum time period during which the interrupt service routine (ISR) cannot be interrupted. It is also possible to use the non-interrupt-ability parameter to determine when an ISR can be interrupted, and for how long. The non-interrupt-ability parameter can be used to relax the requirements on frequency and duration of an interrupt routine, so that higher relative priorities are not necessarily inferred.

The atomicity parameter defines whether the ISR needs to be performed atomically such that either the entire ISR is performed, or none of ISR is performed.

The required latency guarantee parameter defines the maximum allowable time delay between the hardware notifying the CPU of an interrupt request and the software handler starting to act upon the interrupt request. The required latency guarantee parameter is important for safety critical applications and security applications. This is because when the required latency guarantee parameter is exceeded it can indicate that there is something wrong with the system or that the system may be under attack.

Figure 3:
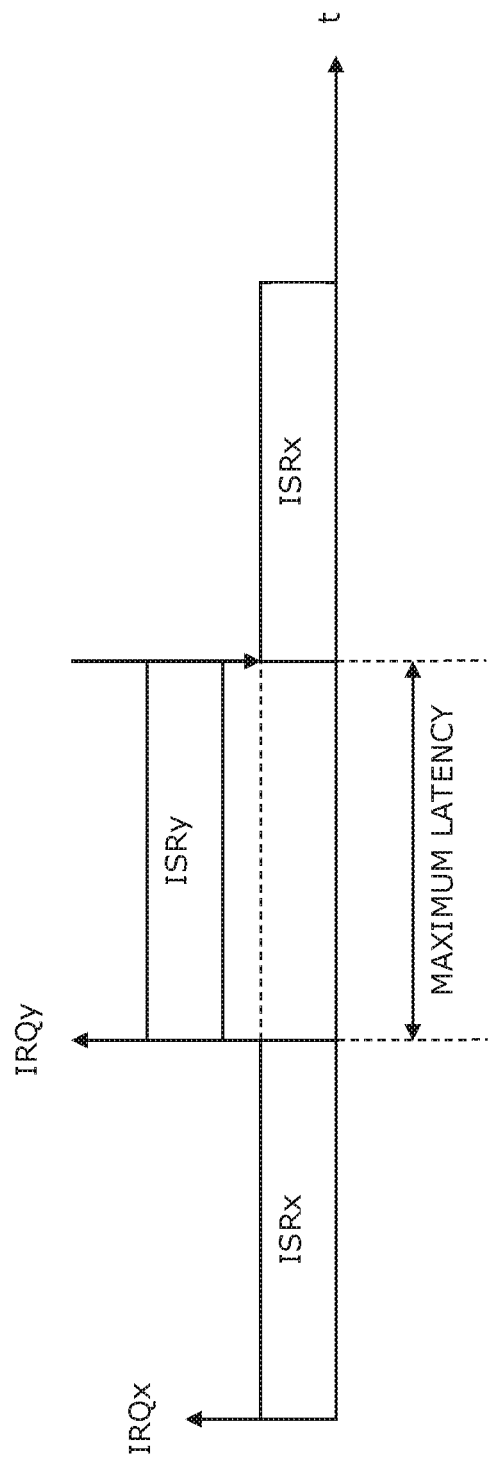
FIG. 3 illustrates schematically a maximum latency parameter.

FIG. 3 illustrates schematically the maximum latency parameter which can be associated with an interrupt. The maximum latency parameter defines a maximum period of time within which the ISR must terminate. In one embodiment, a periodic system timer module interrupt may be required to occur every 3 hours but only takes 10 minutes to run. The maximum latency parameter can be used to determine a maximum interrupt-ability time, i.e. the maximum time period that the ISR can be interrupted or delayed for. After the maximum latency period has expired, the interrupt must be completed. Therefore, the maximum latency parameter defines that an interrupt request from the periodic system timer module can be interrupted for up to 2 hours 50 minutes but must be run in the last 10 minutes. The maximum latency parameter can reduce the relative priority of the interrupt when at the beginning of the period of time within which the ISR must terminate, but can also be used to increase the relative priority of the interrupt when near the end of the period of time within which the ISR must terminate.

The privacy parameter defines whether the central processing unit (CPU) register and hardware content needs to be cleared after the interrupt service routine has run, for example clearing password or ID information, or whether register clearing can be skipped.

The core registers parameter defines which CPU registers need to be saved during an interrupt. Saving the CPU registers means that the CPU registers are stored in case the interrupting code needs to change them.

The hw context privacy parameter defines when a state of a peripheral is required to be stored and erased. This may be required when a higher relative interrupt is to be run. The state of a peripheral is then restored after the higher relative interrupt has been run, so that operation can continue. Consequently, preventing shared peripheral registers from leaking across the context switch.

The sharing parameter defines which peripherals/resources can be shared, i.e. whether memory can be shared. Some interrupts will not allow sharing of peripherals in order to maintain security requirements, whereas other interrupts may not be security critical and therefore will permit sharing.

The permissions parameter defines which peripherals or resources the interrupt requires access to, and whether such accesses must be exclusive or can be shared.

The interrupt parameters define information regarding the interrupts and are used to determine a relative priority for the associated interrupt, with respect to the other interrupts of the system. The relative priority is determined such that the constraints defined in the interrupt parameters are complied with. For example, an interrupt having a duration parameter defining a small period of time within which the ISR must execute in response to the interrupt request is determined to require a higher relative priority then an interrupt having a duration parameter which defines a larger period of time within which the ISR must execute. Consequently, each interrupt is prioritised in compliance with its parameters and with respect to the other interrupts of the system.

The relative priority associated with each interrupt can change with time. For example, a periodic system timer module could have a maximum latency parameter defining that the interrupt is required to run once every 3 hours. When the time period defined by the maximum latency parameter is not near expiry, for example at 2 hours, the associated interrupt could have a relatively low priority with respect to the other interrupts of the system. However, when the time period defined by the maximum latency parameter is near expiry, for example at 2 hours 50 minutes, then the associated interrupt could have a relatively high priority with respect to the other interrupts of the system. Once the interrupt has run, and the maximum latency parameter been reset, then a relatively low priority is again associated with the interrupt. The determined relative priorities are adjusted during operation of the system, in accordance with changes to the interrupt parameters.

The supervisor module of the system determines the relative priorities of the interrupts of the system, during operation of the system, adjusting the relative priorities of the interrupts prior to the interrupts being handled by the interrupt controller. In this way, the limited hardware of a known interrupt controller may be utilised even when thread priorities are required to be adjusted during operation of the system, the supervisor module adjusting the relative priorities. The supervisor module is triggered upon changes in interrupt parameters, or reaching of interrupt/scheduling deadlines, which may result in the relative priority of the interrupt requiring to be altered. According to one embodiment, the supervisor module is external to the interrupt controller.

At compile time, runtime or installation, the supervisor module of the system, prioritises the interrupts of the system, it determines the relative priority of each interrupt. The interrupts of the system are prioritised based on the constraints defined by the interrupt parameters associated with each interrupt and the other interrupts of the system. When a new module is added to a system, the supervisor module re-balances the relative priorities for all the modules of the system to avoid interrupt conflicts. A new module may be added to the system at compile-time and/or at runtime.

According to one embodiment, the hardware priorities of the interrupt controller may re-prioritize for all interrupts while they are served. Therefore, when changes in interrupt parameters result in the relative priority of the interrupt requiring to be altered, the supervisor module determines the order of the updates to the relative interrupt priorities, so that each individual and atomic update does not break the expected priorities. This is because for safety reason interrupts should not be shut down for re-configuring atomically.

In one embodiment, a check is performed to confirm that the relative priority associated with each interrupt is appropriate for that interrupt, such that the constraints defined by the interrupt parameters associated with that interrupt are met. The interrupts of each module of the system are prioritised relative to the other interrupts of the system by the supervisor module of the system. The user of the system can then receive the reconciled interrupts either as a signed configuration block or as part of a signed firmware update.

The interrupts are prioritised relative to the other interrupts of the system, in order to avoid interrupt conflicts whilst the system is running. In some circumstance, the supervisor module may not be able to determine which interrupt, between two or more interrupts, requires a higher priority and therefore, cannot determine a relative priority for those interrupts. In that circumstance, a user/installer of the system is required to determine the relative priorities of those interrupts. The user/installer is only required to make a determination when the system is unable to determine a prioritisation. After the user has prioritised the interrupts, that user prioritisation is then used by the system to determine the relative priorities for the interrupts to avoid interrupt conflicts whilst the system is running, and the user will not be asked the determine the same interrupt conflict again. When the supervisor module is able to determine which interrupt, between two or more interrupts, requires a higher priority and therefore determines relative priorities, the users input is not required. The user "believes" the supervisor modules reconciliations and is not required to understand the reasoning behind the relative priorities'.

A check can be made to determine whether the interrupt parameters are compatible with respect to the peripherals and resources they access and the correct security levels are imposed. Therefore, the interrupt parameters can be validated such that the correct security levels are applied.

The supervisor module combines the requirements of each interrupt, defined in the interrupt parameters, which may change with respect to time (for example, when the time period defined by the maximum latency parameter is near expiry, the associated interrupt has a higher relative priority with respect to the other interrupts of the system), as well as with respect to space (for example, when a sharing parameter defines which peripherals/resources may/may not be shared and/or accessed). The interrupt parameters define "temporal" access permissions as well as "spatial" access permissions. The temporal access permissions regulate access to the time domain, such as guaranteed CPU resources and/or latency requirements. The spatial access permissions regulate access to memories, including access to peripheral memory regions and IO ports. Spatial access permissions impact temporal domain ACLs in case virtualization of access privileges is required—either because of not having enough spatial ACL registers in hardware for simultaneously allowing access or resulting from sharing specific peripherals across security domains (switching overhead). The grant of a spatial or temporal requirement is dependent on the permissions of the nd security domain. For example, a very tight realtime interrupt configuration would not be acceptable for a low-privilege security domain. The complex requirements of temporal access permissions and spatial access permissions are compiled into interrupt parameters which can be applied by the supervisor module, such that a simple interrupt controller can be utilised.

According to one embodiment, the interrupt parameters may be compiled into a state machine that can be executed by the supervisor module, the state machine changing states in response to changes in the interrupt parameters, for example when the maximum latency parameter is near expiry.

Figure 4:
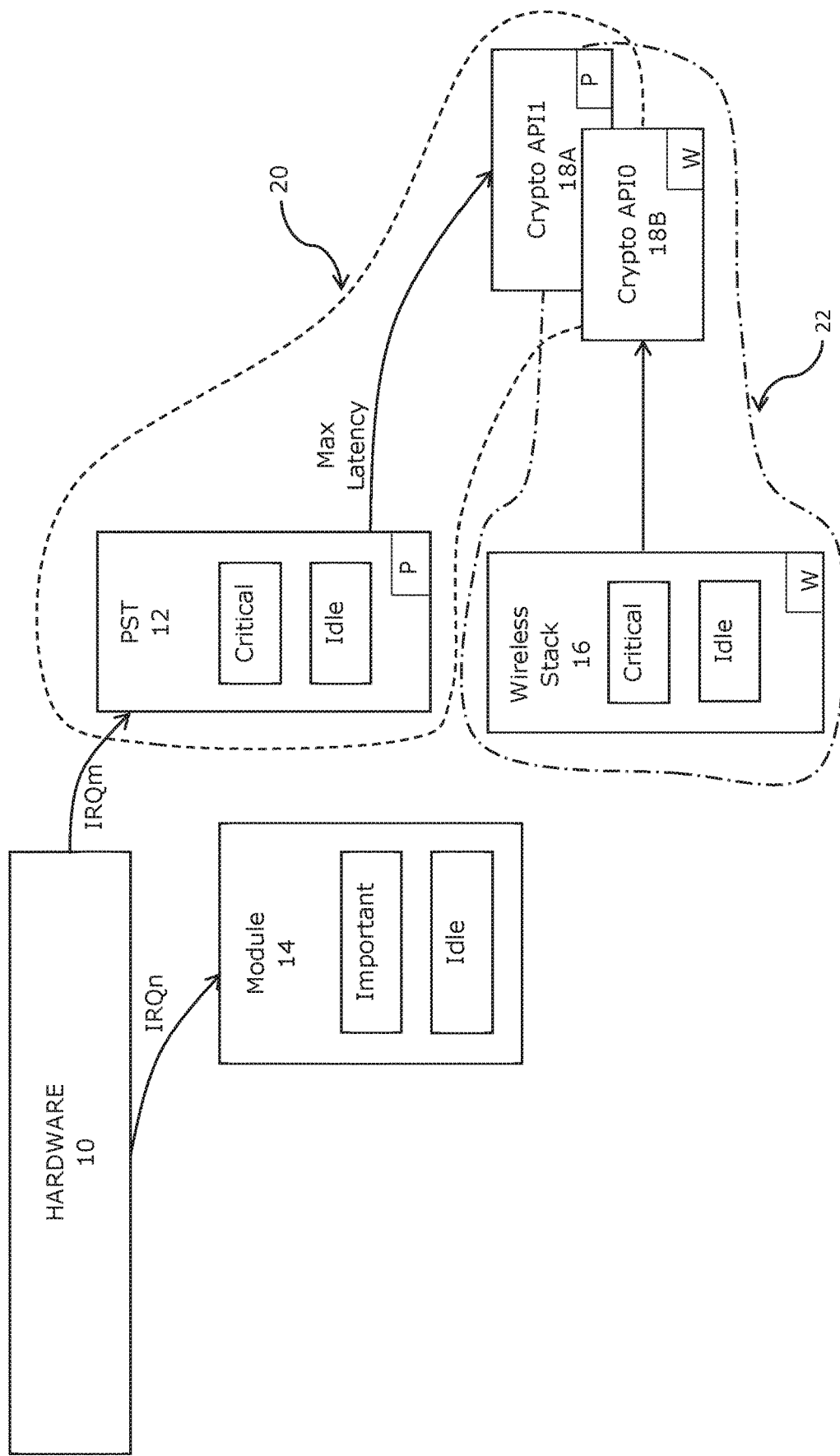
FIG. 4 illustrates schematically another computer system.

FIG. 4 illustrates another system comprising a periodic system timer module 12 and a module 14, and further comprising a wireless stack module 16 and a crypto API module 18. Both the periodic system timer module 12 and the wireless stack module 16 have an assigned priority parameter of "critical". However, the periodic system timer module 12 has a maximum latency parameter of 120 minutes, whilst the wireless stack module 16 has a maximum latency parameter of 1 millisecond. When the time period defined by the periodic system maximum latency parameter is not near expiry, a relative priority of the wireless stack module 16 is set higher than a relative priority of the periodic system timer module 12 such that interrupt requests from the wireless stack module 16 are run before interrupt requests from the periodic system timer module 12.

For example, an interrupt request from the periodic system timer module 12 needs to run within the periodic system maximum latency timeframe defined in the periodic system maximum latency parameter (i.e. once every 120 minutes), or a periodic system timer will elapse and generate a timeout signal, which is not desirable. However, an interrupt request from the wireless stack module 16 needs to run within the wireless stack maximum latency timeframe defined in the wireless stack maximum latency parameter (i.e. once every 1 millisecond), or the connection to the internet will be lost. Therefore, when the time period defined by the periodic system maximum latency parameter is not near expiry, interrupt requests from the wireless stack module 16 are assigned a higher relative priority than interrupt requests from the periodic system timer module 12. However, when the periodic system timer module interrupt request has not been run and the time period defined by the periodic system maximum latency parameter is near to expiry, then the interrupt request from the periodic system timer module 12 is assigned a higher relative priority than the interrupt request from the wireless stack module 16, such that the interrupt request from the periodic system timer module 12 is run. Although this may result in the internet connection been momentarily lost, the periodic system timer can be reset, which is more beneficial to the overall system. In addition, once the interrupt request from the periodic system timer module 12 has run successfully, the relative priority of the periodic system timer module 12 is re-adjusted to be lower than the relative priority of the wireless stack module 16, since the time period defined by the periodic system maximum latency parameter has been reset and is not near expiry.

Interrupt requests from different modules of the system to the same module of the system may have different safety and/or security requirements. In one embodiment, referring to FIG. 4, an interrupt request from the periodic system timer module 12 which requires access to the crypto API module 18 has different safety and/or security requirements from an interrupt request from the wireless stack module 16 which also requires access to the crypto API module 18.

Figure 5:
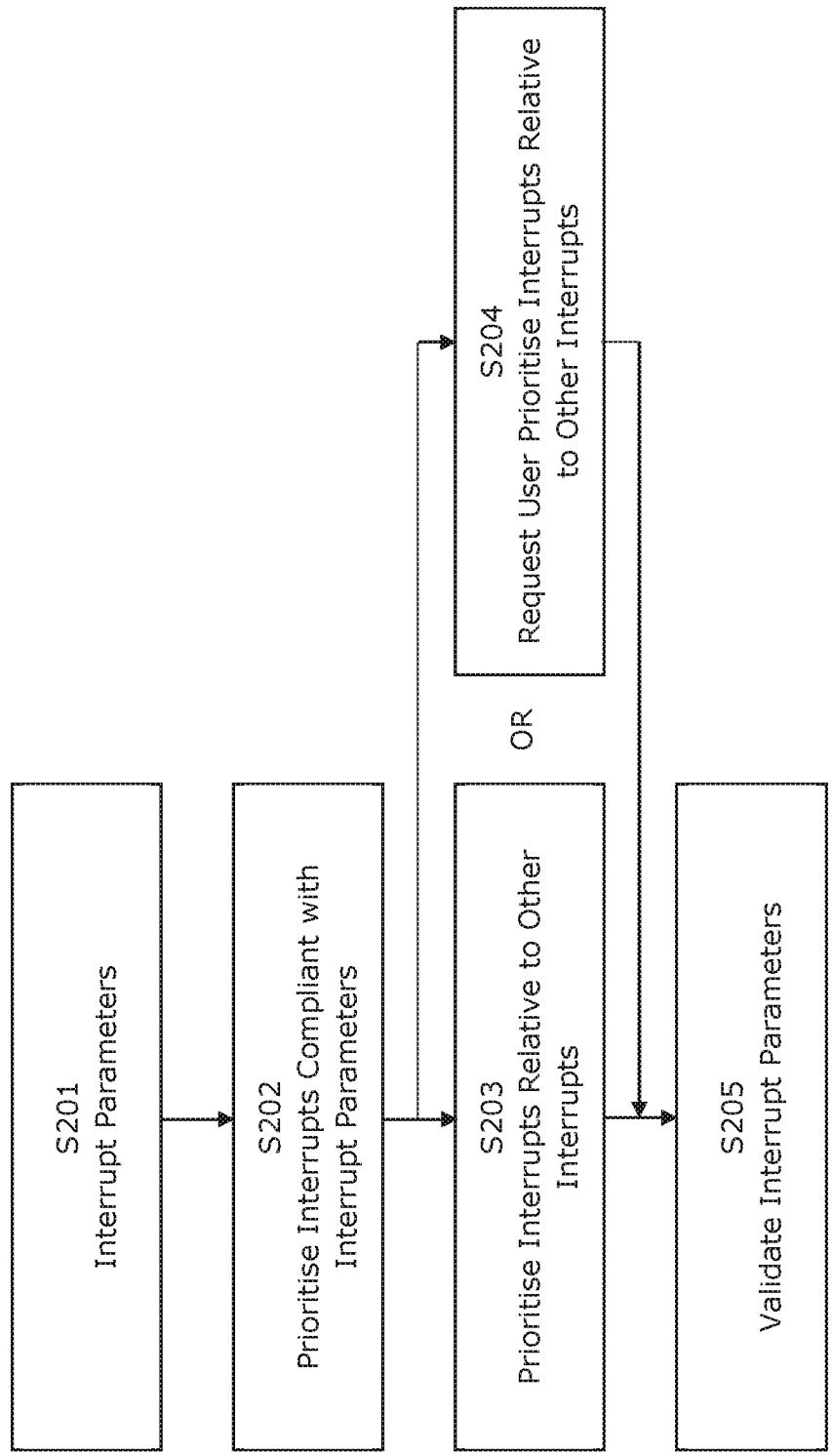
FIG. 5 illustrates schematically a flow diagram of a process for prioritising interrupt requests.

FIG. 5 illustrates schematically a flow diagram of a process for prioritising interrupt requests. At step S201 the interrupt parameter(s) associated with an interrupt are read. At step S202 a priority is determined for each interrupt dependent on the at least one parameter. At step S203 each interrupt is prioritised based on their determined priority and relative to the determined priority of the other interrupts of the system. At step S204, when the system is not able to prioritise an interrupt relative to the other interrupts of the system, then a user is requested to prioritise the interrupt. At step S205, the parameters of each interrupt are validated against at least one of a peripheral or a resource which the interrupt requires access to. Step S205 is optional. In addition, step S205, could be performed earlier in the process, such as after step S201.

Figure 10:
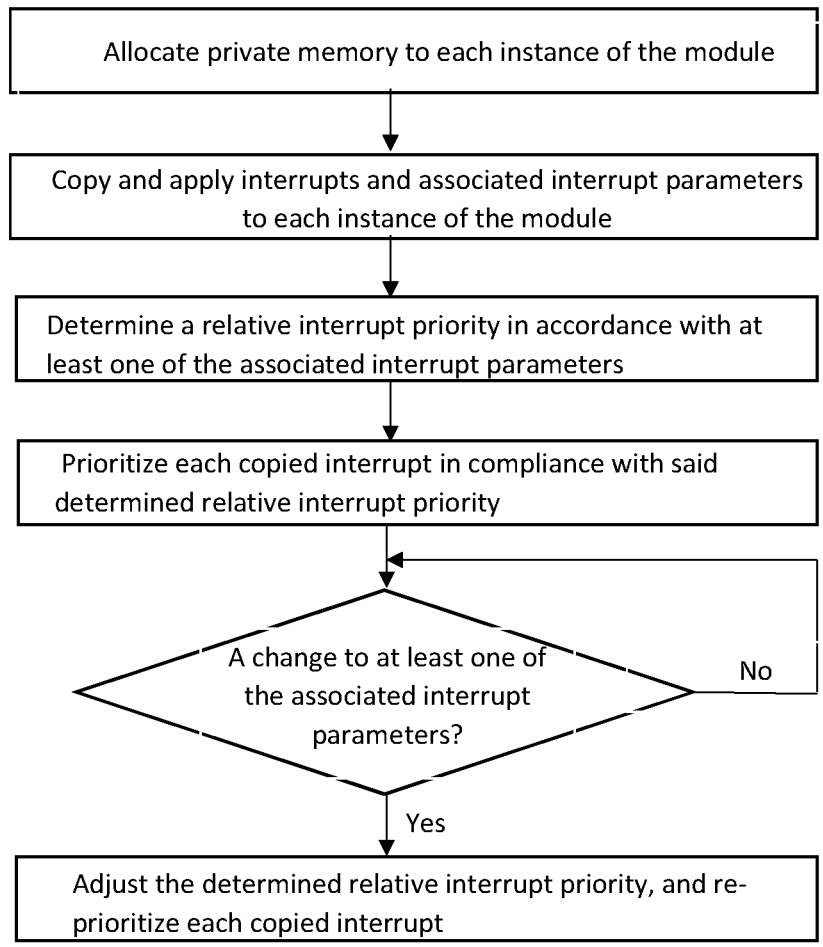
FIG. 10 illustrates schematically a flow diagram of a process creating one or more instances of a module in a processing system according to some embodiments.

FIG. 10 illustrates schematically a flow diagram of a process creating one or more instances of a module in a processing system according to some embodiments. In one embodiment, multiple instances of each module of the system can be generated. Each module, which can be considered the "parent" module, having as many instances as the number of secure/private states it needs to keep. With reference to FIG. 4, an instance 18A of the parent crypto API module 18 is created for requests from the periodic system timer module 12, and an instance 18B of the parent crypto API module 18 is created for requests from the wireless stack module 16. Each instance of a module can be generated as required, and is a copy of the "parent module".

In one embodiment, multiple instances of each module of the system can be generated. Each module, which can be considered the "parent" module, having as many instances as the number of secure/private states it needs to keep. With reference to FIG. 4, an instance 18A of the parent crypto API module 18 is created for requests from the periodic system timer module 12, and an instance 18B of the parent crypto API module 18 is created for requests from the wireless stack module 16. Each instance of a module can be generated as required, and is a copy of the "parent module".

Each instance of a module is allocated a new chunk of memory that is private to that instance, including the module stack, heap and private context. In addition, each instance of a module comprises a copy of the "parent" modules interrupts and interrupt parameters. The copied interrupt parameters are applied separately to each instances interrupts when appropriate. Therefore, each instance of a module can have a different relative priority from that of the "parent" module and from that of other instances of the module, as required. Instances of the same "parent" module which have variable interrupt parameters, may have different relative priorities. For example, an instance of the periodic system timer module having a maximum latency parameter that is near to expiry is likely to have a higher relative priority, than an instance of the periodic system timer module having a maximum latency parameter that is not near to expiry.

Each instance of a module is treated by the system as a separate module. On a switch between modules of the system, in order to execute multiple processes or threads concurrently, there may actually be a switch between instances of the modules. There can be one instance of a module for each thread, and each instance is capable of having a different relative priority from that of the "parent" module and from that of other instances of the module. The instances of the modules can be created as required. In one embodiment, the instances are created at runtime.

With reference to FIG. 4, the periodic system timer module 12 and the wireless stack module 16 both call the crypto API module 18, therefore the system is considered to comprise four modules, the periodic system timer module 12, the wireless stack module 16, the crypto API module 18A when called from the periodic system timer module 12, and the crypto API module 18B when called from the wireless stack module 16. Both the crypto API modules 18A and 18B share the same code but use two different memories, isolated from each other. The instances 18A and 18B are mutually distrustful, like all other secure modules. The instances can be dynamically created and destroyed, whilst conventional secure modules are static and allocated at compile time.

Interrupt requests issued from the crypto API module 18A when called from the periodic system timer module 12 can have different parameters from interrupt requests issued from the crypto API module 18B when called from the wireless stack module 16 as a result of the parameters associated with the periodic system timer module 12 and wireless stack module 16. Consequently, interrupt requests issued from the crypto API module 18A when called from the periodic system timer module 12 can have a different relative priority from interrupts requests issued from the crypto API module 18B when called from the wireless stack module 16.

Figure 6:
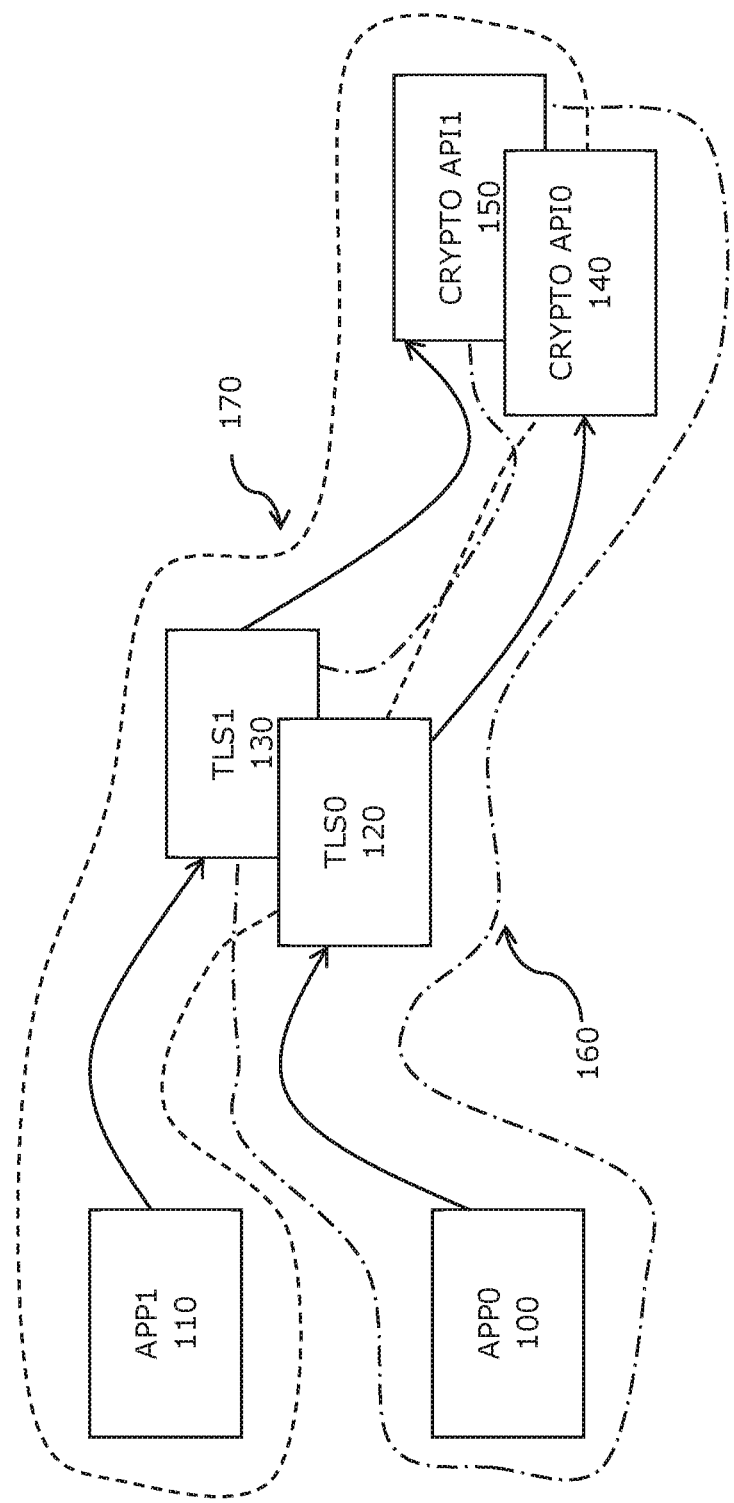
FIG. 6 illustrates schematically grouped modules.

FIG. 6 illustrates multiple instances. As illustrated in FIG. 6, a system comprises APP0 100 and APP1 110. Both applications require the TLS module and the Crypto API module in order to perform secure communications. However, in order to maintain the security of each application 100, 110, further instances of the TLS module and the Crypto API modules are generated. APP0 100 then uses the TLS0 120 instance and the Crypto API0 140 instance in order to perform secure communications, whereas the APP1 110 then uses the TLS1 130 instance and the Crypto API1 150 instance in order to perform secure communications.

Each time a module is required, that is already required by a different module, a new instance of that module is generated. It is possible for the instances to be deleted once used, if no longer required.

Each module can be provided with an optional handler for suspending and resuming an operation within a pre-determined maximum timeframe. The handler allows the operating system to suspend the ongoing operation and resume it later when the ongoing operation is interrupted by a higher priority instance of itself. When the module does not suspend the operation in time, the operating system aborts the modules operation altogether, forcing the module to restart that operation, when the higher priority instance operation has been performed. For example, each instance of the module may include a timing parameter Time_Latency_Instance_switch. The Time_Latency_Instance_switch parameter defines the maximum time period for which an ongoing operation can be suspended. The Time_Latency_Instance_switch parameter defines a time period which is equal to the time period required for the module_instance_switch plus the time period required for the call_suspend plus the time period required for wait_suspend. In addition, the Time_Latency_Instance_switch parameter defines a time period which is less than the maximum latency parameter of the module.

The non-interrupt-ability parameter defines a minimum period of time of non-interrupt-ability i.e. a minimum time period during which the interrupt service routine (ISR) cannot be interrupted. It is also possible to use the non-interrupt-ability parameter to determine when an ISR can be interrupted, and for how long.

Combinations of modules/instances of modules of the system can be treated as groups. Groups can be determined for each process of the system which requires access to more than one module of the system. An execution stream is identified for each process, representing a full trace of calls between different modules required for that process. The execution stream is used by the supervisor module of the system to define the groups of the system. The modules required for a process are treated as a group, and a relative priority can be associated with each group. Each groups relative priority depends on the interrupt parameter(s) associated with each module of the group. The groups can also include instance of modules as well as modules.

The groups are inferred from the execution stream identified for each process. The modules/instance of each module required for the execution stream are not physically formed into a group, consequently a module can be part of more than one group. The groups are defined so that a group relative priority and group parameters can be determined for each group. The group relative priority and group parameters apply to interrupts issuing from the combination of modules defined by the group. Group relative priorities and group parameters can save time when the system is in use.

With reference to FIG. 4, the periodic system timer module 12 and crypto API instance 18A form a first group 20 having an associated relative priority, and the wireless stack module 16 and crypto API instance 18B form a second group 22 having an associated relative priority. With reference to FIG. 6, APP0 100, TLS0 120 and the Crypto API0 140 form a first group 160, and the APP1 110, the TLS1 130 and the Crypto API1 150 form a second group 170. Both groups 160 and 170 have a relative priority associated with interrupt requests issuing from that group. Although FIG. 4 illustrates two instances of the crypto API module 18, it is possible to form the groups without generating instances of modules.

Figure 7:
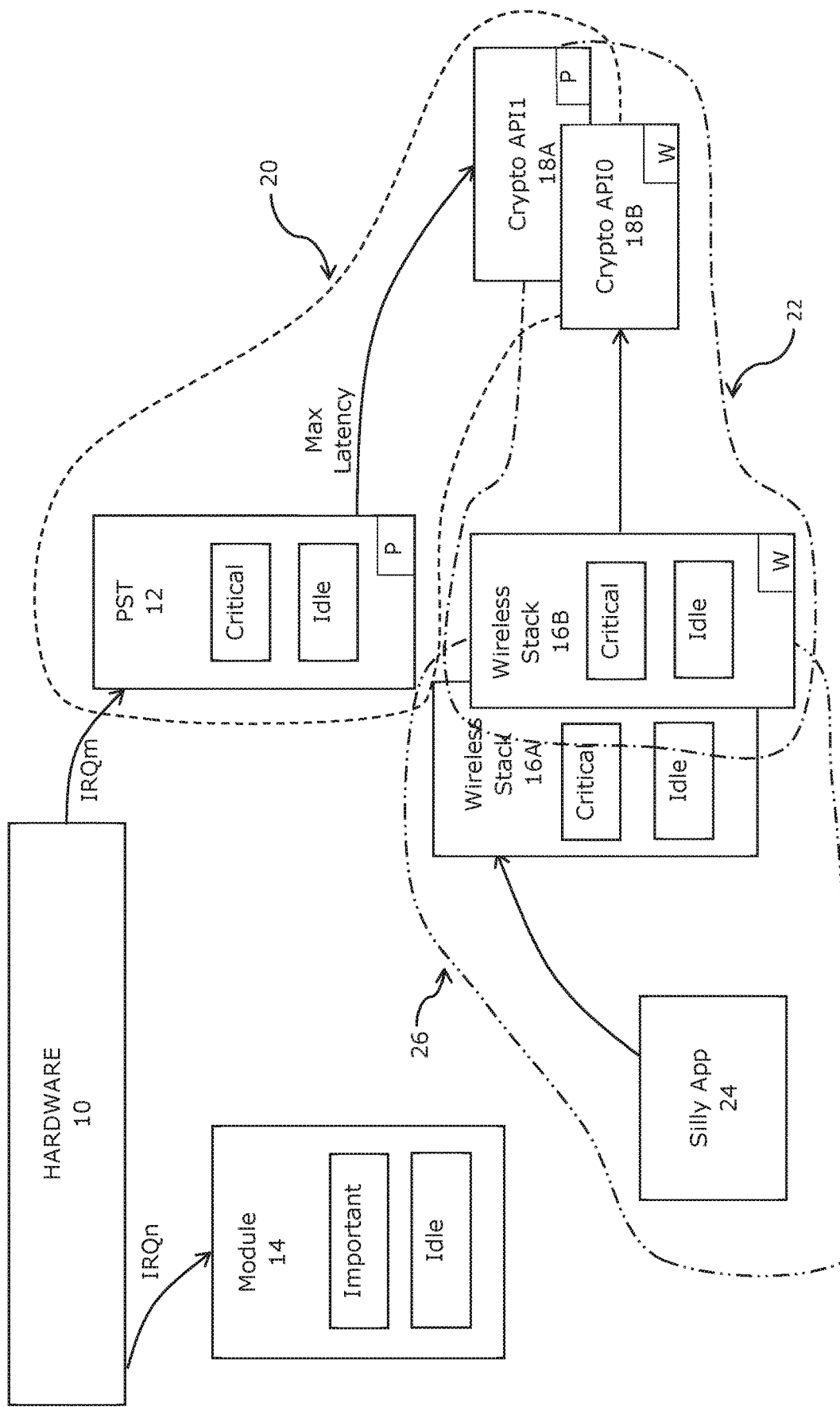
FIG. 7 illustrates schematically another computer system.

FIG. 7 illustrates a system, similar to that of FIG. 4, but including an additional module, the application Silly App 24, which requires access to the wireless stack 16. Interrupt requests from the wireless stack 16 have a high relative priority, whereas Interrupt requests from Silly App 24 do not require a high relative priority, for example the assigned priority parameter associated with Silly App 24 is low. Therefore, by grouping Silly App 24 with an instance of the wireless stack 16A, interrupt requests from the wireless stack 16A are not associated with a high relative priority but are associated with a lower relative priority by virtue of the request ultimately issuing from the Silly App 24.

Each group is associated with its own relative priority, relative to the other groups of the system and relative to the individual modules of the system. Each groups relative priority is determined for the overall group as a result of the interrupt parameter(s) associated with each module of the group.

The groups can be defined at compile time or at system updates when an application/module is added to the system. The user/installer of the overall system can be provided with group notifications, notifying the user of each group and requesting the user approve each group. The user can also be requested to approve the relative priority of each group. The security of the overall system can be improved, by requiring that the user approves each group. In another embodiment, the user/installer is not requested to approve the groups and/or the relative priority of each group.

In another embodiment, the groups can be defined at runtime. However, in this embodiment, the user/installer may not be requested to approve the groups and/or the relative priority of each group. Determining groups at runtime can be useful, for example, for diagnosis and code execution fingerprinting.

As stated above, the parameters associated with each module are defined by the provider of the module. When a parameter does not create any interrupt conflicts in the system, then, even if the module does not actually require such a parameter, the parameter is accepted by the system as it will not prevent the system from running. For example, when a module has a high assigned priority, the high assigned priority is accepted by the system when the high assigned priority does not prevent the system from running. However, if such a high assigned priority creates conflicts in the system, then either the system will adjust the relative priority of the module, effectively reducing the assigned priority, or the system will request a user's input to resolve the potential conflict. At which point it is likely that the user will adjust the assigned priority to be more appropriate for the module. Once the priority of the interrupt has been confirmed, then the user is not asked again.

Figure 8:
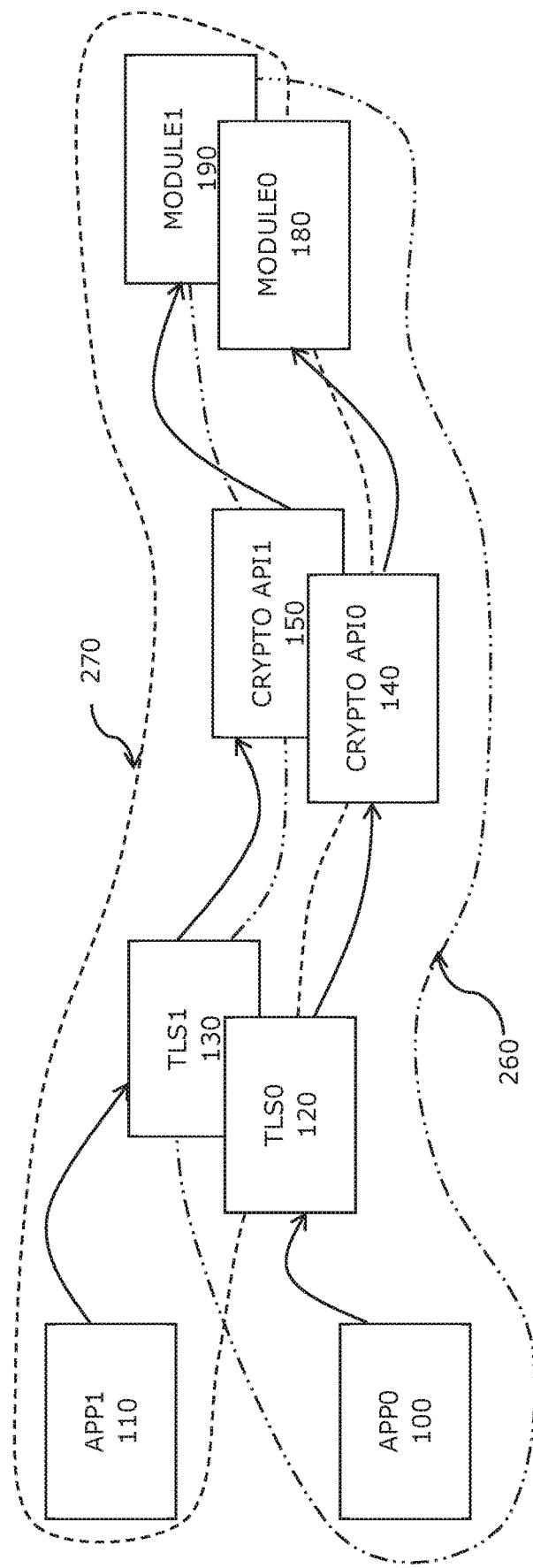
FIG. 8 illustrates schematically grouped modules.

According to one embodiment, the parameters applied to a group are applied from the main module of the group. With reference to FIG. 7, the main module of the group 26 is Silly App 24, therefore the parameters associated with Silly App 24 are applied to each subsequent module called from the main module (Silly App 24), and each subsequent module called from the module which has been called from the main module, and so on. With reference to FIG. 8, the APP0 100 and the APP1 110 are the main modules of their respective groups, and both the APP0 100 and the APP1 110 have associated parameters. The parameters associated with the APP0 100 and the APP1 110 are applied to each subsequent module ultimately called from the APP0 100 or APP1 110. The parameters defined for APP0 100 are applied to the TLS0 120, the Crypto API0 140 and the module 180, whereas the parameters defined for APP1 110 are applied to the TLS1 130, the Crypto API1 150 and the module 190.

According to another embodiment, a rules set or engine can be used to determine which parameter(s) from a plurality of modules take precedent when relative priorities are inferred for a plurality of modules. An example of a rules set is shown below:

GroupX=((PrioA>PrioB>PrioC)<(PrioD=PrioE:non_interruptible))
GroupY=PrioF:non_interruptible>(PrioG=GroupIdle)
GroupIdle=PrioH
GroupY>GroupX
GroupX>GroupIdle GroupX comprises five modules having priorities PrioA, PrioB, PrioC, PrioD, and PrioE where PrioA>PrioB>PrioC and all of which have a lower priority than PrioD and PrioE, where PrioD and PrioE have equal priority. GroupY comprises two modules having priorities PrioF, and PrioG, where PrioF has a higher priority than PrioG. GroupIdle comprises one modules having priority PrioH. PrioF and PrioE are marked as non-interruptible and although GroupY has a higher priority, PrioG ends up lower priority than GroupX, running at idle priority.

In addition, the rules for assigning relative priorities can be mapped onto groups so that they can be applied to other software components, if required.

Figure 9:
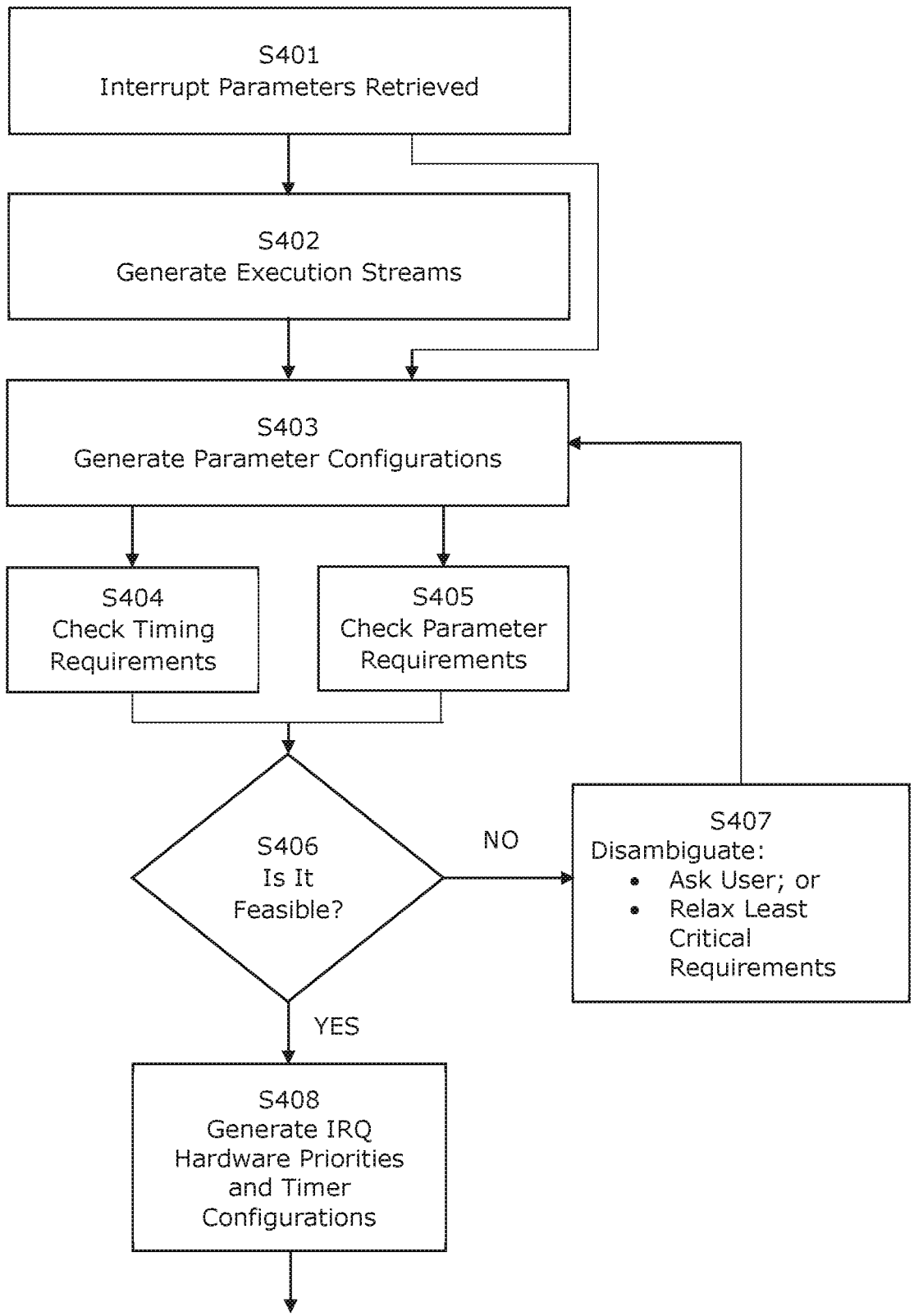
FIG. 9 illustrates schematically a flow diagram of a process for implementing interrupt parameters.

FIG. 9 illustrates a flow diagram of a process for implementing interrupt parameters. At step S401, the interrupt parameters of each module are obtained. The interrupt parameters can be encoded in several ways depending on the architecture used. In one embodiment, the interrupt parameters are stored using a data list structure, such as an ACL associated with the interrupts of a module. Each module is associated with at least one interrupt parameter defining an assigned priority, a timing requirement, and/or a safety and/or security requirement.

For example, a software module uses three interrupt channels, channel 42, channel 43 and channel 44. The software module has the following interrupt parameters:

1. channel 42 has highest assigned priority, and channels 43 and 44 have equal assigned priority, below 42—examples of assigned priority parameters;

2. channel 42 has a maximum duration requirement of 500 ms—an example of a timing parameter;

3. channel 42 has a non-interrupt-ability requirement of 30 ms (i.e. an interrupt service routine is not to be interrupted in its first 30 ms, but can be interrupted later if needed, between 30 ms and 500 ms)—an example of a timing parameter;

4. channels 43 and 44 have a frequency requirement of 200 ms (i.e. an interrupt occurs, on average, every 200 ms)—an example of a timing parameter; and 5. channel 42 is marked as safety critical—an example of a safety and/or security parameter.

At step S402 execution streams are generated. Each execution stream is identified for each process, representing a full trace of calls between different modules in that process. This information is used to define the groups. Step S402 is optional because not all implementations use multi-threading or execution streams.

At step S403 the parameter configurations are generated based on the interrupt parameters associated with each module and each group, if groups are defined. The supervisor module of the system takes the interrupt parameters, input at step S401, and generates hardware and software configurations that can be used to enforce the interrupt parameters. The hardware and software parameter configurations can differ from architecture to architecture, but the interrupt parameters are the same.

In most applications, the parameter configurations will end up as two elements:

1. Hardware priority levels; and
2. Hardware timer configurations.

The parameter configurations are effectively different from the original interrupt parameters input at step S401. This is because the same interrupt parameter can be implemented using different hardware/software features depending on the specific implementation. For example, a timing parameter, such as rules 2, 3 and 4 above, might be implemented using hardware interrupt levels, and not a hardware timer. However, this is implementation specific and depends on the hardware features available.

At steps S404 the timing requirements of the generated hardware timer configurations are checked and at step S405 the priority requirements of the priority level configurations are checked. For example, a check can be made to determine whether the interrupt has been provided an appropriate relative priority, for the constraints of the interrupt parameters to be valid, relative to the other interrupts of the system. In addition, a check can be made to determine whether the interrupt parameters are compatible with respect to the peripherals and resources they access and the correct security levels are imposed. Therefore, the interrupt parameters can be validated such that the correct security levels are applied.

The hierarchy of interrupt priorities can be dynamically changed to accommodate the interrupt parameters, for example to accommodate interrupts that require very seldom or brief occurrences. For example, as described above, interrupt requests from a periodic system timer module can be elevated up the hierarchy when the duration parameter is near to expiry, and can be dropped down the hierarchy when the duration parameter is reset.

It is then determined at step S406 whether the generated configurations are feasible or whether there are any IRQ conflicts. When a conflict is detected, the process moves to step S407. At step S407 the conflict is resolved either by asking a user to priorities the conflicting interrupt requests or by relaxing the least critical requirement of the parameters of the conflicted interrupt requests. The process then returns to step S406 where it is determined whether the generated configurations are feasible or whether there are any IRQ conflicts. When no conflicts are detected, then the process moves to step S408. At step S408 the hardware priorities and configurations are generated.

The process of FIG. 9 can be performed at compile time, or at runtime, or during system updates.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing machine implemented methods for constraining the operation of system interrupts in a processing element. Thereby reducing the number of interrupt conflicts when the processing element is running.

In embodiments, said at least one interrupt parameter comprises at least one of: an assigned priority requirement for said interrupt; a timing requirement for said interrupt; a safety and/or security requirement for said interrupt.

In embodiments, the method is performed at runtime.

In embodiments, the method is performed at compile time.

In embodiments, the method is performed when a new module is added to said system.

In embodiments, the re-prioritising of each interrupt is performed prior to the interrupts being handled by an interrupt controller.

In embodiments, said method further comprises: validating said parameters against at least one of a peripheral or a resource said interrupt requires to access. Validating the parameters provides a check that the appropriate security level and accesses are applied.

In embodiments, said timing requirement for said interrupt comprise one or more of: a Time_Latency_Instance_switch requirement for said interrupt; a duration requirement for said interrupt; an occurrence frequency requirement for said interrupt; an atomicity requirement for said interrupt; a non-interrupt-ability requirement for said interrupt; a required latency guarantee requirement for said interrupt; and a maximum latency requirement for said interrupt. The timing requirements can be used to adjust the priority of the associated interrupt, to reduce the number of interrupt conflicts when the processing element is running.

In embodiments, said safety and/or security requirement for said interrupt comprise one or more of: an access permission requirement for said interrupt; a privacy requirement for said interrupt; a core registers requirement for said interrupt; a hw context privacy requirement for said interrupt; and a sharing requirement for said interrupt. The safety and/or security requirements can be used to maintain an appropriate level of security when the processing element is running.

In embodiments, said Time_Latency_Instance_switch requirement for said interrupt defines a maximum time period for which an ongoing operation can be suspended.

In embodiments, said duration requirement for said interrupt defines a period of time required for said interrupt to execute in response to an interrupt request. The duration requirement can be used to make sure that the associated interrupt is awarded the correct relative priority.

In embodiments, said non-interrupt-ability requirement for said interrupt defines whether said interrupt can be interrupted, when said interrupt can be interrupted, and for how long said interrupt can be interrupted. The non-interrupt-ability requirement can be used to make sure that the associated interrupt is awarded the correct relative priority.

In embodiments, said required latency guarantee requirement for said interrupt defines a maximum allowable time delay between notification of an interrupt request and initiation of said interrupt in response to said notification. The required latency guarantee requirement can be used to make sure that the associated interrupt is awarded the correct relative priority and that the security of the processing element is maintained.

In embodiments, said maximum latency requirement for said interrupt defines a maximum period of time within which said interrupt is to terminate. The maximum latency requirement avoids the processing element freezing when a required interrupt is not run.

In embodiments, said occurrence frequency requirement for said interrupt defines a minimum rate of occurrence of said interrupt. The occurrence frequency requirement avoids the processing element freezing.

In embodiments, said atomicity requirement for said interrupt defines whether said interrupt needs to be performed atomically.

In embodiments, said core registers requirement for said interrupt defines which CPU registers are to be saved during an interrupt. The CPU registers are stored in case the interrupting code needs to change them.

In embodiments, said hw context privacy requirement for said interrupt defines when a state of a peripheral is required to be stored and erased. The state of a peripheral is then restored after the higher relative interrupt has been run, so that operation can continue. Consequently, preventing shared peripheral registers from leaking across the context switch.

In embodiments, said sharing requirement for said interrupt defines which peripherals can be shared. The security of the processing element is increased by preventing sharing of unauthorised peripherals by interrupts In embodiments, said privacy requirement for said interrupt defines whether a central processing unit (CPU) register and hardware content needs to be cleared after an interrupt service routine has run, or whether register clearing can be skipped. The security of the processing element is increased by clearing password and/or ID information.

In embodiments, said access permission requirement for said interrupt defines which peripherals or resources the interrupt requires access to, and whether such accesses are to be exclusive or can be shared. The security of the processing element is increased.

In embodiments, said parameters are stored in a data list structure associated with each said interrupt. Resulting in a simply way to store the parameters.

In embodiments, said parameters are stored in an access control list (ACL).

In embodiments, said method further comprises: requesting a user's input when at least one of said interrupts cannot be prioritised relative to said other interrupts of said processing element. A user is only requested to resolve a conflict when the conflict cannot be resolved by the processing element.

As will be appreciated from the foregoing specification, techniques are described providing machine implemented methods for creating one or more instances of a module in a processing element. By creating multiple instances of a module, the security of the modules of the system can be enhanced.

In embodiments, said method further comprises: in response to a change to one or more of said associated interrupt parameters during operation of the system, adjusting said determined relative interrupt priority, and re-prioritising each said copied interrupt with respect to other interrupts of said system in compliance with said adjusted relative interrupt priority, prior to said interrupts being handled by an interrupt controller. In embodiments, said method further comprises: dynamically creating said one or more instances of said module as required.

In embodiments, said method further comprises: deleting said one or more instances of said module when said one or more instances of said module are no longer required.

In embodiments, said method further comprises: prioritising each said interrupt compliant with said at least one parameter; and prioritising each said interrupt relative to other interrupts of said processing element.

In embodiments, said prioritising of each said interrupt of said one or more instances of said module varies for each said one or more instances of said module. Therefore, each instance can have a different relative priority associated with its interrupts.

In embodiments, said interrupt parameters comprise at least one of: an assigned priority requirement for said interrupt; a timing requirement for said interrupt; a safety and/or security requirement for said interrupt.

In embodiments, said processing system comprises a plurality of modules, each said module capable of issuing said interrupts. The method further comprising: determining, at a supervisor module, for each copied interrupt, a relative interrupt priority in accordance with at least one of said associated interrupt parameters; prioritising, at said supervisor module, each said copied interrupt with respect to other interrupts of said system in compliance with said determined relative interrupt priority; and in response to a change to said at least one associated interrupt parameter during operation of the system, adjusting said determined relative interrupt priority, and re-prioritising each said copied interrupt with respect to other interrupts of said system in compliance with said adjusted relative interrupt priority, prior to said copied interrupt being handled by an interrupt controller In embodiments, said modules comprise hardware modules or software modules.

In embodiments, said groups are defined at compile time, or at runtime, or at installation.

As will be appreciated from the foregoing specification, techniques are described providing a data processor for constraining the operation of system interrupts in a processing element. Thereby reducing the number of interrupt conflicts when the processing element is running.

In embodiments, said processing circuitry is further configured to validate said parameters against at least one of a peripheral or a resource said interrupt requires to access.

In embodiments, said processing circuitry is further configured to request a user's input when said processing circuitry is no able to prioritise each said interrupt relative to said other interrupts of said processing element.

The invention claimed is:

1. A machine implemented method for prioritising system interrupts in a processing system, each of the system interrupts being associated with one or more interrupt parameters, said method comprising:
   determining, at a supervisor module, for each interrupt, a relative interrupt priority in accordance with at least one interrupt parameter associated with said interrupt;
   prioritising, at said supervisor module, each said interrupt with respect to other interrupts of said system in compliance with said determined relative interrupt priority; and
   in response to a change to said at least one interrupt parameter during operation of said system, adjusting said determined relative interrupt priority, and re-prioritising each said interrupt with respect to said other interrupts of said system in compliance with said adjusted relative interrupt priority,
   wherein the at least one interrupt parameter defines at least one temporal access permission and/or at least one spatial access permission.

2. The machine implemented method of claim 1, wherein said at least one interrupt parameter comprises at least one of: an assigned priority requirement for said interrupt; a timing requirement for said interrupt; a safety and/or security requirement for said interrupt.

3. The machine implemented method of claim 2, wherein said safety and/or security requirement for said interrupt comprises one or more of:
   an access permission requirement for said interrupt;
   a privacy requirement for said interrupt;
   a core registers requirement for said interrupt;
   a hw context privacy requirement for said interrupt; and
   a sharing requirement for said interrupt.

4. The machine implemented method of claim 1, wherein said method is performed at runtime.

5. The machine implemented method of claim 1, wherein determining the relative interrupt priority in accordance with the at least one interrupt parameter associated with said interrupt and prioritising each said interrupt with respect to other interrupts of said system in compliance with said determined relative interrupt priority are performed at compile time.

6. The machine implemented method of claim 1, wherein said method is performed when a new module is added to said system.

7. The machine implemented method of claim 1, wherein said re-prioritising each said interrupt is performed prior to said interrupts being handled by an interrupt controller.

8. The machine implemented method of claim 1, further comprising:
   validating said interrupt parameters against at least one of a peripheral or a resource said interrupt requires access to.

9. The machine implemented method of claim 2, wherein said timing requirement for said interrupt comprises one or more of:
   a Time_Latency_Instance_switch requirement for said interrupt;
   a duration requirement for said interrupt;
   an occurrence frequency requirement for said interrupt;
   an atomicity requirement for said interrupt;
   a non-interrupt-ability requirement for said interrupt;
   a required latency guarantee requirement for said interrupt; and
   a maximum latency requirement for said interrupt.

10. The machine implemented method of claim 1, wherein said interrupt parameters are stored in a data list structure associated with each said interrupt.

11. The machine implemented method of claim 10, wherein said parameters are stored in an access control list (ACL).

12. The machine implemented method of claim 1, wherein said processing system comprises a plurality of modules, each said module capable of issuing said interrupts, said method further comprising:

identifying an execution stream for each process to be performed by said processing system, said execution stream indicating two or more modules of said plurality of modules required by said process;

defining a module group comprising said two or more required modules;

determining, at said supervisor module, for each group interrupt of said module group, a relative interrupt priority in accordance with at least one interrupt parameter associated with said group interrupt, each group interrupt of said module group being associated with one or more interrupt parameters;

prioritising, at said supervisor module, each said group interrupt of said module group with respect to other interrupts of said system in compliance with said determined relative interrupt priority; and in response to a change to said at least one interrupt parameter during operation of said system, adjusting said determined relative interrupt priority, and re-prioritising each said group interrupt of said module group with respect to said other interrupts of said system in compliance with said adjusted relative interrupt priority.

13. The machine implemented method of claim 1, wherein the at least one temporal access permission regulates access to time domain and the at least one spatial access permission regulates access to a memory.

14. The machine implemented method of claim 1, wherein prioritizing one of the system interrupts with respect to other interrupts of said system in compliance with said determined relative interrupt priority comprising requesting a user to determine the relative interrupt priority of the interrupt.

15. A non-transitory computer readable medium having computer readable program code embodied thereon for performing said method of claim 1.

16. A machine implemented method for creating one or more instances of a module in a processing system, said method comprising:

allocating private memory to each of said one or more instances of said module being created;

copying interrupts of said modules being created and interrupt parameters associated with the interrupts;

applying said copied interrupts and associated interrupt parameters to each of said one or more instances of said module being created;

determining, at a supervisor module, for each copied interrupt, a relative interrupt priority in accordance with at least one of said associated interrupt parameters; and prioritising, at said supervisor module, each said copied interrupt with respect to other interrupts of said system in compliance with said determined relative interrupt priority;

wherein each said one or more instances of said module is isolated from said module and other instances of said module, wherein the at least one interrupt parameter defines at least one temporal access permission and/or at least one spatial access permission.

17. The machine implemented method of claim 16, further comprising:

in response to a change to said at least one associated interrupt parameters during operation of said system, adjusting said determined relative interrupt priority, and re-prioritising each said copied interrupt with respect to said other interrupts of said system in compliance with said adjusted relative interrupt priority.

18. The machine implemented method of claim 16, further comprising:

dynamically creating said one or more instances of said module as required.

19. The machine implemented method of claim 16, further comprising:

deleting said one or more instances of said module when said one or more instances of said module are no longer required.

20. The machine implemented method of claim 16, wherein said prioritising of each said copied interrupt of said one or more instances of said module varies for each said one or more instances of said module.

21. The machine implemented method of claim 16, wherein said interrupt parameters comprise at least one of:

an assigned priority requirement for said interrupt;

a timing requirement for said interrupt; and a safety and/or security requirement for said interrupt.

22. A data processor for prioritising system interrupts in a processing system, each of the system interrupts being associated with one or more interrupt parameters, said data processor comprising:

processing circuitry configured to determine for each said interrupt a relative interrupt priority in accordance with at least one interrupt parameter associated with said interrupt, and to prioritise each said interrupt with respect to other interrupts of said system in compliance with said determined relative interrupt priority;

said processing circuitry further configured to, in response to a change to said at least one interrupt parameter during operation of said system, adjust said determined relative interrupt priority, and re-prioritise each said interrupt with respect to said other interrupts of said system in compliance with said adjusted relative interrupt priority, wherein the at least one interrupt parameter defines at least one temporal access permission and/or at least one spatial access permission.

* * * * *